J. C. LEWIS.
Nut-Lock.

No. 207,047. Patented Aug. 13, 1878.

WITNESSES:
W. W. Hollingsworth
E. dw. W. Byrn

INVENTOR:
John C. Lewis
BY
ATTORNEYS.

UNITED STATES PATENT OFFICE.

JOHN C. LEWIS, OF CHARLOTTESVILLE, VIRGINIA.

IMPROVEMENT IN NUT-LOCKS.

Specification forming part of Letters Patent No. 207,047, dated August 13, 1878; application filed July 30, 1878.

*To all whom it may concern:*

Be it known that I, JOHN C. LEWIS, of Charlottesville, in the county of Albemarle and State of Virginia, have invented a new and Improved Nut-Lock; and I do hereby declare that the following is a full, clear, and exact description of the same, reference being had to the accompanying drawing, forming part of this specification, in which—

Figure 1:
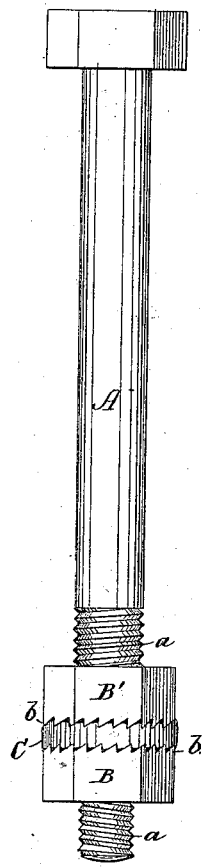
Figure 2:
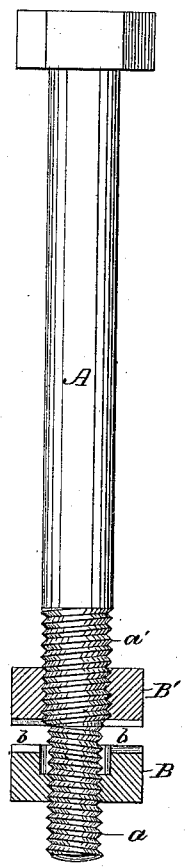

Figure 1 is a side view of a bolt with the nuts locked by the elastic washer. Fig. 2 is a similar view of the bolt with the nuts separated and the washer removed.

My invention relates to an improvement in nut-locks; and it consists in combining a leather or other soft or elastic washer with two nuts having adjacent ratchet-faces, and arranged, respectively, upon right and left threads on the bolt, the leather washer being first wetted to soften it, and then compressed between the ratchet-teeth of the nuts, whereby the two nuts are rigidly connected and both prevented from turning by the right and left thread, as hereinafter more fully described.

In the drawing, A represents a bolt, whose end is provided with right and left threads, $a$ and $a'$, which threads may be either square or V-shaped. These right and left threads may be arranged separately or upon different portions of the bolt, in which case the outer portion of the thread is of less diameter, as shown; or the right and left threads may be on the same portion of the bolt and crossing each other. B B' are the two nuts, one of which, B, has a female thread corresponding to the thread $a$ of the bolt, and the other of which has a female thread corresponding to the thread $a'$, which is arranged reversely to $a$.

When the bolt is made with the right and left threads upon different portions of the stem, the nut B, next to the end, is recessed or countersunk with a cavity large enough to receive the shoulder formed between the different diameters of the stem. This cavity may extend about half-way through the nut, and serves to allow so much more variation for the locking-point in fastening the nuts.

The adjacent faces of both the nuts are provided with ratchet-teeth $b$, between which is compressed a soft washer, C, of leather or other soft or elastic material. In applying the leather washer it is first wetted until made perfectly soft and pliable, in which condition it is placed between the nuts and the latter turned to their tightened positions.

In screwing the outer nut down to its place, it will be seen, the soft washer is forced into the ratchet-teeth of both the nuts, and after it becomes hard and horny in this position, it constitutes a rigid connection, which prevents one nut from turning without the other, and as the two nuts are respectively arranged upon reversed threads, they cannot turn together, and an effectual and absolute lock is thus provided.

Should it be necessary to remove the nuts at any time, the outer or left-hand nut may be turned with a wrench, tearing or stripping off the teeth formed in the leather washer, and thus removing the nuts at the expense of the washer, but leaving the ratchet-teeth of the nuts intact.

Instead of using leather for the washer, any other soft or yielding material may be employed.

In defining my exact invention with greater clearness, I do not claim, broadly, a bolt having a right and left thread with two smooth-faced nuts arranged upon the different threads; nor do I claim two nuts having adjacent ratchet-faces and an interposed leather washer, when such nuts are arranged upon the same thread.

In the first of these cases the nuts having no ratchet-faces are, unless held together by other devices, apt to turn away from each other upon their respective threads, while in the latter case one of the nuts has to be fastened to the bearing-surface to prevent them from both turning together on the same thread.

By combining the right and left threaded bolt, the two nuts having adjacent ratchet-faces, and the interposed elastic washer, a secure and reliable nut-lock is formed, independent of any connection with the surface against which the inner nut bears, and independent of any extra devices for holding the two nuts together. Hence,

What I claim is—

The combination, with the right and left nuts B B', having adjacent ratchet-faces, and the bolt having right and left thread, of the soft or elastic washer C, compressed between the ratchet-faces of the nuts, substantially as and for the purpose described.

The above specification of my invention signed by me this 20th day of July, 1878.

JNO. C. LEWIS.

Witnesses:
SOLON C. KEMON,
CHAS. A. PETTIT.